United States Patent [19]

Engle

[11] Patent Number: 5,281,887
[45] Date of Patent: Jan. 25, 1994

[54] TWO INDEPENDENT SPATIAL VARIABLE DEGREE OF FREEDOM WAVEFRONT MODULATOR

[76] Inventor: Craig D. Engle, 336 Cline Ave., Griffith, Ind. 46319

[21] Appl. No.: 898,414

[22] Filed: Jun. 15, 1992

[51] Int. Cl.$^5$ .............................................. H01L 41/08
[52] U.S. Cl. ................................... 310/335; 310/322; 310/328; 310/333; 358/233; 359/224
[58] Field of Search ................................ 310/367–369, 310/322, 328, 333–335; 367/152, 153, 155; 358/233; 359/224

[56] References Cited

U.S. PATENT DOCUMENTS

| | | | |
|---|---|---|---|
| 2,943,297 | 6/1960 | Steinberger et al. | 367/155 |
| 2,998,546 | 8/1961 | Kuntz et al. | 315/169 |
| 3,146,367 | 8/1964 | McNaney | 310/367 |
| 3,233,040 | 2/1966 | Crane | 178/70 Q |
| 3,385,927 | 5/1968 | Hamann | 178/70 Q |
| 3,479,109 | 11/1969 | Preston | 350/161 |
| 3,487,239 | 12/1969 | Schafft | 310/8.5 |
| 3,544,202 | 12/1970 | Fowler | 350/285 |
| 3,558,351 | 1/1971 | Foster | 117/201 |
| 3,626,084 | 12/1971 | Wohl | 178/7.5 D |
| 3,637,931 | 1/1972 | Donjon et al. | 178/7.5 |
| 3,753,022 | 8/1973 | Fraser | 313/78 |
| 4,211,948 | 7/1980 | Smith et al. | 310/322 |
| 4,736,132 | 4/1988 | Culp | 310/333 |
| 4,747,192 | 5/1988 | Rokurota | 29/25.35 |
| 4,775,817 | 10/1988 | Duwaer et al. | 313/12 |
| 5,027,822 | 7/1991 | Gelly et al. | 128/661.01 |
| 5,045,746 | 9/1991 | Wersing et al. | 310/334 |

FOREIGN PATENT DOCUMENTS 2401356 8/1974 Fed. Rep. of Germany ...... 367/155

OTHER PUBLICATIONS

D. W. Kennedy et al, A survey of Laser Displays, Sp-159,1968-28648, Recent Advances in Display, symposium held in Cambridge, Mass., Sep. 19-20, 1967, sponsored by Electronics Research Center, NASA, Anon, NASA, Wash. D.C.

C. V. Newcomb, Improving the Linearity of Piezoelectric Ceramic Actuators, Electronics Letters, May 27, 1982, vol. 18, No. 11.

O. F. Hamann, RADC-TR-65-451, pp. 25-28.

Duane A. Haven, Electron-Beamed Addressed Liquid-Crystal Light Value, IEEE Transactions on Electron Devices, vol. ED-30, No. 5, May 1983.

John A. van Raalts, Reflective Liquid Crystal Television Display, Proceedings of the IEEE, vol. 56, No. 12, Dec. 1968.

(List continued on next page.)

Primary Examiner—Mark O. Budd
Assistant Examiner—Thomas M. Dougherty

[57] ABSTRACT

To provide electrical isolation to piezoelectric parallel shear mode elements in wavefront phase modulators arrays, the functionality of the mounting configuration is increased. The mounting configuration involves embedding a respective interface electrode affixed to a second face of each piezoelectric element of the array in an insulating ridge. This allows the ridge to provide electrical isolation to interface electrodes affixed to adjacent elements. A first surface of every element is electrically connected to a common potential source by a suitable means. Electrically connecting the first surface of every adjacent element in the array to a common potential source avoids electrical interference between adjacent elements. By increasing the functionality of the ridges and making judicious use of common potential interconnects between adjacent elements, extraneous components, such as electrical insulators can be eliminated. This facilitates implementation of piezoelectric wavefront phase modulator arrays.

20 Claims, 3 Drawing Sheets

OTHER PUBLICATIONS

D. Hulsenberg and R. Bruntsch, Glasses and Glass-Ceramics for Applications in Micromechanics, J. of Non-Crystalline Solids, 129 (1991) 199-205.

Kazuaki Utsumi et al, Application of Designed Space Forming Technology, Proceedings of the 6th Meeting on Ferroelectrics Materials and Their Applications Jap. Journal of Applied Physics, vol. 26 (1987) Supplement 26-2, pp. 53-56.

M. Eyett and D. Bauerle, Excimer-Laser-Induced Etching of Ceramic $PbTi1-xZrxO3$, J. Appl. Phys. 62 (4), Aug. 15, 1987.

T. R. Gururaja et al, Continuous Poling of PZT Fibers and Ribbons and It's Application to New Devices, Ferroelectrics, 1983, vol. 47, pp. 193-200.

Robert W. Vest, Metallo-Organic Decomposition (MOD) Processing of Ferroelectric and Electro-Optic Films: A review Ferroelectrics, 1990, vol. 102, pp. 53-68.

Lyn Bowman et al, Electrical Contacts to Implantable Sensors by $CO_2$ Laser-Drilled Vias through Glass, Micromachining and Micropackaging of Transducers, edited by C. D. Fung, et al.

Ordered Three Dimensional Circuit Arrays, Ser. No. 07/893,712, Filing Date Jun. 5, 1992 Applicant; Craig D. Engle.

Michael Fritsch et al, A Liquid-Crystal Phase Modulator for Large-Screen Projection, IEEE Transactions on Electron Devices vol. 36, No. 9 Sep. 1989.

Sing H. Lee et al, Two-Dimensional Silicon/PLZT Spatial Light Modulators: Design Considerations and Technology, Optical Engineering/ Feb. 1, 1986/ vol. 25 No. 2.

K. Nakamura and H. Shimizu, Hysteresis-Free Piezoelectric Actuators Using $LiNbO3$ Plates with a Ferroelectric Inversion Layer, Ferroelectrics, 1989, vol. 93, pp. 211-216.

David Casasent, E-Beam DKDP Light Values, Optical Engineering vol. 17 No. 4 Jul.-Aug. 1978.

G. Marie et al, Pockels-Effect Imaging Devices and Their Applications, Advances in Image Pick-Up and Displays Devices 1974, pp. 225-302.

G. Marie, Light Values Using DKDP Operated Near It's Curie Point: Titus and Phototitus, Ferroelectrics, 1976, vol. 10, pp. 9-14.

Electronic Image Storage, p. 16.

J. R. Hansen and R. J. Schneeberger, Liquid Crystal Media for Electron Beam Recording, IEEE Transactions on Electron Devices, vol. ED-15, No. 11, Nov. 1968.

M. C. Marcellus et al, Heat Transfer Characteristics of Flurochemical Inert Liquid PO-75, Journal of Chemical and Engineering Data, vol. 6, No. 3, Jul. 1961.

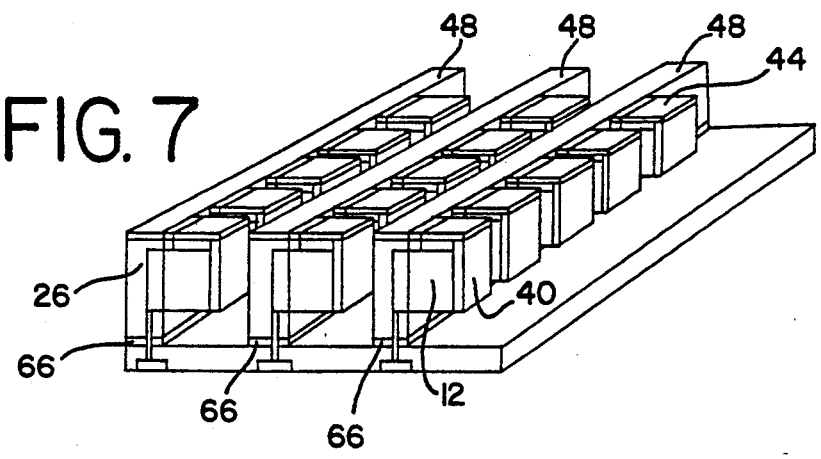
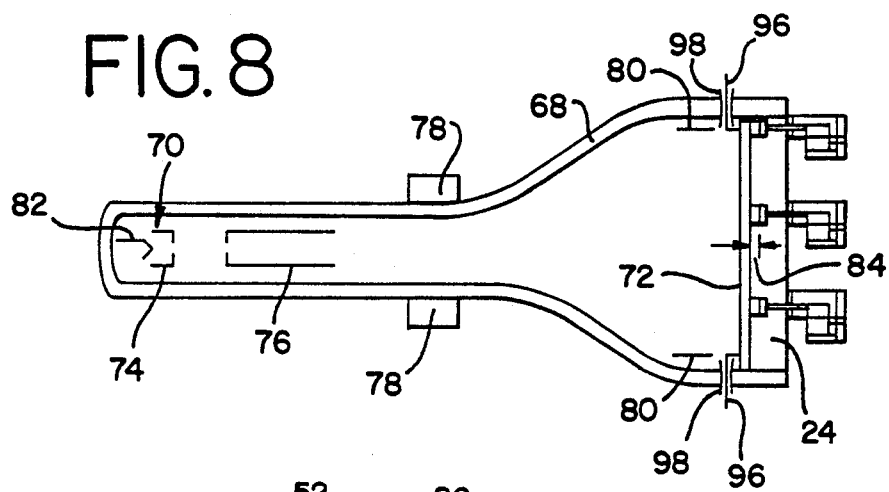
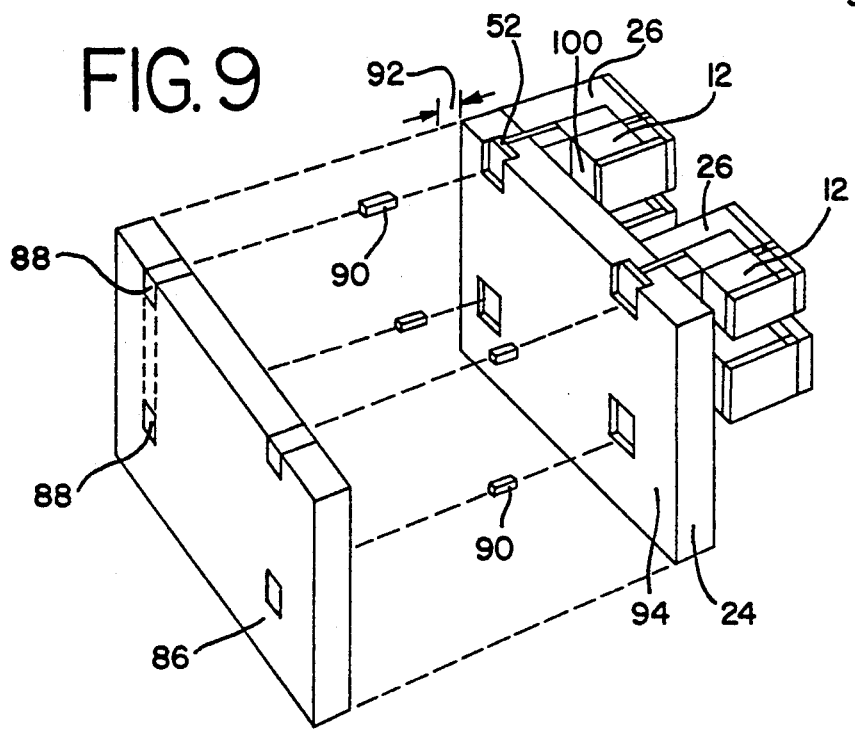

TWO INDEPENDENT SPATIAL VARIABLE DEGREE OF FREEDOM WAVEFRONT MODULATOR

BACKGROUND-FIELD OF INVENTION

This invention relates to piezoelectric wavefront modulators, to a shear mode modulator configuration which has two independent spatial variable degrees of freedom in it's modulation function.

BACKGROUND-DESCRIPTION OF PRIOR ART

Prior art concerning surface deformation type wavefront modulators will be broadly classified into two categories. Those devices utilizing monolithic phase modulating media, and those devices using discrete elements.

Examples of monolithic media include oil films, elastomer layers, piezoelectric media, glass substrates, and thin membranes.

Devices employing monolithic media exhibit surface deformations which are non-localized. As cited in U.S. Pat. No. 3,479,109 to K. Preston, Nov. 18, 1969, non-localized surface responses impose a limit on spatial resolution.

Discrete element modulators offer a device philosophy amendable to isolation, thereby permitting high spatial resolution. Previous discrete element configurations utilizing piezoelectric shear mode elements include "A Survey of Laser Display," FIG. 4, by D. W. Kennedy, Recent Advances in Display Symposium held in Cambridge, Mass., Sept. 19-20, 1967, sponsored by Electronics Research Center, NASA, Anon, NASA, Wash. D.C. Sp-159, 1968-28648, U.S. Pat. No. 3,544,202 to Fowler, Dec. 1, 1970, and to Culp, Apr. 5, 1988.

A piezoelectric transverse shear mode modulator is the subject of a patent application admitted to Craig D. Engle as serial number 07/787,673, filing date Nov. 4, 1991, title "Constrained Shear Mode Modulators". In light of this consideration, U.S. Pat. No. 3,544,202 and U.S. Pat. No. 4,736,132 must be further classified as parallel shear mode modulators.

In U.S. Pat. No. 3,544,202, a wavefront is propagated by a sequence of reflections from different parallel shear mode elements. To fully utilize the spatial resolution attainable in discrete elements modulators, a one-to-one correspondence should exist between a wavefront sample and a shear mode element. A one-to-one correspondence is not utilized in U.S. Pat. No 3,544,202 and is contrary to discrete element philosophy of wavefront modulators. From the description and configuration provided, it is clear that the intent of the device is to function as a beam steering device and not a two independent spatial degree of freedom wavefront modulator. Furthermore, it shares many of the limitations associated with U.S. Pat. No. 4,736,132.

In U.S. Pat. No. 4,736,132, the phase modulator exhibits independent modulation characteristics in only one spatial dimension. This is due to the fact that each element in the array spans the entire second spatial dimension of the array, forcing a uniform phase modulation characteristic on this spatial variable. FIG. 1 of U.S. Pat. No. 4,636,132 illustrates this limitation.

Electrical isolation of elements is a key consideration when employing piezoelectric devices. The preference in U.S. Pat. No. 4,736,132 is to use electrical insulators to reduce electrical interference. As to be shown herein, this approach hinders implementation of two independent spatial variable degrees of freedom wavefront modulators. Furthermore, the method of integration of the insulators reduces spatial resolution attainable in the array.

To contemplate phase modulating in two independent spatial degrees of freedom using U.S. Pat. No. 4,736,132, each shear mode element would need to be segmented along the length which spans the array. Performing this function will not lead to a satisfactory two dimensional device. Adjacent electrodes along a segmented row would now have electrical interference. An exposure area due to the thickness of the electrode and it's vertical height is presented to adjacent electrodes along the segmented row. Despite a preference for electrical insulators, no provisions are identified to address this source of interference, adversely effecting this configuration's ability to function as a two independent spatial degree of freedom wavefront modulator. Furthermore, this approach does not fully utilize the functionality inherent in the substrate and electrode structure.

In U.S. Pat. No. 4,736,132, the functionality of the center support is limited. Due to the chosen electrode structure, no electrical isolation function is provided by this element. Due to this fact, as to be shown herein, extraneous components are required to electrically isolate adjacent electrodes of this configuration. Extraneous components are undesirable from a cost effective standpoint and hinder spatial resolution.

Applications for two independent spatial degree of freedom wavefront modulators include display applications. When utilizing phase modulators in applications of this nature, phase modulations could be converted irradiance modulations by a variety of methods. These include schlieren techniques. As identified in technical report RADC-TR-71 March 1971, "Dielectric Membrane Light Value Study", "Dark Field" techniques have a desirable attribute of high contrast. "Dark Field" techniques also involve non-linearities in the phase to irradiance relationships. As well understood by those knowledgeable in the state of the art, piezoelectric devices exhibit hysteresis and creep. Non-linearities in phase to irradiance relationships accentuate the need for hysteresis correction for piezoelectric devices functioning in these wavefront modulating applications. No hysteresis or creep correction techniques are identified for use with U.S. Pat. No. 4,736,132 or U.S. Pat. No. 3,544,202.

As identified in the article "Improving the Linearity of Piezoelectric Ceramic Actuactors" by C. V. Newcomb, Electronics Letters, May 27, 1982, Vol. 18, No. 11, charge drive configurations could be utilized to virtually eliminate hysteresis and creep. No mention of charge drive configurations are made in U.S. Pat. No. 4,736,132. No reference of smart device interfaces is made in U.S. Pat. No. 4,736,132. Smart device interfaces could improve the linearity of piezoelectric actuactors. Any high performance piezoelectric device must address the issue of reducing hysteresis and creep.

The support structure in U.S. Pat. No. 4,736,132 functions as a common electrode for the shear mode elements. Associating a common electrode with the support structure under-utilizes the functionality of the support structure. As to be shown herein, the support structure could function as an electrical insulator, increasing the functionality of this component of the modulator. In addition, the common electrode of each shear mode element could be an exposed electrode. Having exposed electrodes share a common potential and increasing the functionality of the support member eliminates the need for extraneous electrical insulators. This arrangement facilitates electrical isolation, and is amendable to several charge drive configurations which could be part of my invention. These considerations further accentuate the deficiencies of U.S. Pat. No. 4,736,132 to function as a two degree of freedom wavefront modulator.

As well understood by those knowledgeable in the state of the art, piezoelectric devices are temperature sensitive. Consistent performance could require temperature stabilization. At elevated temperatures, some materials could lose their ability to exhibit piezoelectric phenomena. No heat transfer concepts were introduced with U.S. Pat. No. 4,736,132 or U.S. Pat. No. 3,544,202 suggesting a deficiency in regard to this consideration.

The potential applications cited in U.S. Pat. No. 4,736,132 do not include display applications. Not citing display applications as a potential use for U.S. Pat. No. 4,736,132 could be the explanation for the inadequacies in U.S. Pat. No. 4,736,132 to implement a configuration which could function as a two independent spatial variable degree of freedom wavefront modulator. As identified herein, careful consideration must be given to electrode configuration, hysteresis reduction, and heat transfer to configure a piezoelectric device which could function in display applications.

Use of wire mosaics to separate a surface deformation type phase modulation media from environmental concerns include U.S. Pat. No. 3,233,040 to P. J. Crane, Feb. 1, 1966, and U.S. Pat. No. 3,385,927 to O. F. Hamann, May 28, 1967. Additional information concerning wire mosaics is provided in Technical Report No. RADC-TR-65-451 Jan. 1966, "Random Access Light Value Study" by O. F. Hamann. No active heat transfer considerations were incorporated into these mosaics' configurations. Furthermore, both patents utilized discrete addressing lines associated with the wire feedthroughs, but chose to interface to a monolithic media. As previously mentioned, monolithic media exhibit non-localized surface deformations which limit spatial resolution.

Wire mosaics have also been utilized in electron beam addressed liquid crystal light values. Use of mosaics in this regard are discussed in the articles "Electron Beam Addressed Liquid Crystal Light Values" by Duane A. Haven, IEEE Transactions on Electron Devices, Vol. Ed-30n, No. 5, May 1983, and "Reflective Liquid Crystal Television Display" by John A. Van Raulte, Proceedings of the IEEE, Vol. 56, #12, Dec. 1968. These liquid crystal wire mosaics configurations failed to incorporate temperature stabilization schemes. Also, liquid crystal phase modulating media does not posses the flexibility of certain surface deformation type wavefront modulators. They cannot be utilized to phase modulate acoustic wavefronts. They do not possess the spectral flexibility in the electromagnetic spectrum as do reflective, surface deformation type phase modulators. Comparatively speaking, they have a slow temporal response. These are important considerations for infrared display systems to interface with infrared missile seekers. Furthermore, in the visible spectrum, a surface deformation type wavefront modulator functioning in display applications could have significantly improved flux throughput when compared to polarization modulation modulators.

OBJECTS AND ADVANTAGES

Accordingly, several objects and advantages of my invention include:

1.) To introduce a modulator configuration using piezoelectric parallel shear mode elements that exhibits a two independent spatial variable degrees of freedom wavefront modulation capability.

2.) To introduce the notion of a new use patent application for a two independent spatial variable degree of freedom parallel shear mode modulator array in display applications.

3.) To introduce the notion of what constitutes a desirable surface deformation profile for wavefront phase modulators and to show how my invention incorporates this feature.

4.) To increase the functionality of shear mode mounting configurations by having the mounting configuration function as an electrical insulation.

5.) To introduce strain biasing techniques for use with parallel shear mode elements, and to provide evidence of how strain biasing could enhance modulator performance by increasing the functionality of array components and reducing hysteresis.

6.) To show how the common buss structure of my invention could eliminate electrical interference between exposed electrodes in the modulator, thereby eliminating the need for extraneous electrical insulators.

7.) To show how my invention could reduce hysteresis and creep phenomena associated with piezoelectric modulators, thereby enhancing modulator performance capabilities.

8.) To show how the common buss structure of my invention is amendable with, and benefits from, the electrical isolation scheme and could enable a reduction in hysteresis and creep phenomena associated with piezoelectric modulators and could function as a conductive heat transfer element, thereby increasing the functionality and desirability of my invention as compared to prior art.

9.) To show how heat transfer could be introduced in my invention, thereby enhancing the performance capabilities of piezoelectric modulators.

10.) To introduce the notion of a surface deformation type wavefront modulator not requiring polarization modulation, thereby enhancing optical efficiency and having extended spectral flexibility to meet display applications including those in the infrared portion of the electromagnetic spectrum.

DESCRIPTION OF DRAWINGS

FIG. 7 shows a second prestressing option.

FIG. 8 shows a generic electron beam addressed configuration.

FIG. 9 shows a suitable heat transfer means.

DESCRIPTION OF INVENTION

Figure 1:
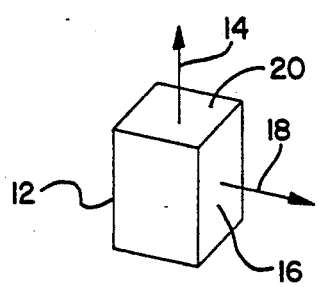
FIG. 1 shows a piezoelectric element.

FIG. 1 shows a single parallel shear mode piezoelectric element 12. Element 12 contains a piezoelectric polarization axis 14. Element 12 further contains a first face 16. Face 16 contains a first face surface normal 18. Normal 18 is perpendicular to axis 14. Element 12 contains a second face. The second face is parallel to first face 16; the second face is not visible in the figure. Element 12 contains a third face 20. Face 20 is perpendicular to axis 14 when element 12 is in an unenergized state. Element 12 contains a fourth face. The fourth face is parallel to the third face. Fourth face is not visible in this figure.

Figure 2:
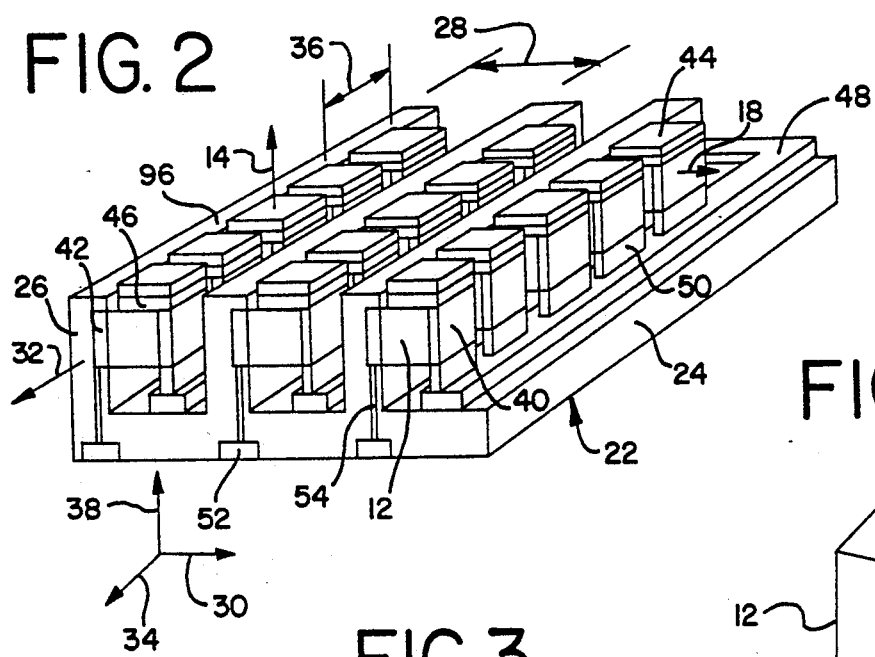
FIG. 2 shows a two dimensional array of parallel shear mode piezoelectric elements with two spatial variable degrees of freedom.

FIG. 2 shows a two independent spatial variable degree of freedom parallel shear mode piezoelectric wavefront modulator array 22. Modulator array 22 contains a substrate 24. Substrate 24 contains a plurality of ridges 26. Adjacent ridges 26 are displaced by a first period 28. First period 28 is parallel to a first axis 30. Each ridge 26 contains a major ridge axis 32. Ridge axis 32 is parallel to a second axis 34. Second axis 34 is perpendicular to first axis 30.

Each ridge 26 contains a plurality of parallel shear mode elements 12. Adjacent elements 12 on each ridge 26 are displaced by a second period 36. Polarization axis 14 is parallel to a third axis 38. Axis 38 is perpendicular to first axis 30 and perpendicular to second axis 34. First face surface normal 18 is parallel to axis 30. A common electrode 40 is affixed by a suitable means to each first face of every element 12 in array 22. (First face and second face of element 12 are not visible in this figure.) An interface electrode 42 is affixed by a suitable means to every second face in array 22. Each interface electrode 42 is affixed by a suitable embedding means to the respective ridge 26. The suitable embedding means conceals adjacent interface electrodes 42 to control electrical interference between adjacent electrodes 42. Embedding each interface electrode 42 in the respective ridge 26, so each ridge 26 could function as an electrical insulator increases the functionality of the ridge. Increasing the functionality of the ridge eliminates the need for extraneous electrical insulators. Suitable electrode embedding means will be described herein. A reflective phase modulating surface 44 is affixed by a suitable means to face 20. Depending upon the material selected for use in elements 12 and the nature of the wavefront to be modulated, face 20 could function as the phase modulating surface. Suitable means for affixing surface 44 to face 20 could include a dielectric layer 46. If element 12 transmits the wavefront to be modulated, a suitable reflective means could be provided on the fourth surface of element 12. The fourth surface of element 12 is not visible in the figure. Suitable reflective means 44 are well understood by those knowledgeable in the state of the art. Due to the wide range of applications, surface 44 could exist in several different forms, including aluminum thin films and multilayer dielectric mirrors. Substrate 24 further contains a common buss 48. Every common electrode 40 is electrically connected by a suitable common interconnect means 50 to common buss 48. Suitable means 50 and electrode 40 is a suitable means for applying a common potential to the first face of each element 12 in array 22. Having a common potential on each first face of adjacent elements 12 eliminates the need for extraneous electrical insulators. As to be shown herein, the common buss structure of my invention is amendable to charge drive configurations, thereby increasing the functionality of the electrode structure of my invention, and enhancing the performance capabilities of my invention.

As to be described herein, a modulation control signal is applied by a suitable means to each interface electrode and the common buss. As well understood by those knowledgeable in the state of the art, the potential difference between each interface electrode and the common electrode causes the respective shear mode element to undergo a strain about an axis which is perpendicular to the piezoelectric axis and the first face surface normal. Shear strain is utilized to phase modulate a wavefront incident on the reflecting phase modulating surface of each respective shear mode element. The suitable means to apply a modulation control signal between each interface electrode and the common buss could include a plurality of drive electrodes 52. Each electrode 52 is embedded in substrate 24. Each drive electrode 52 is electrically connected to a respective interface electrode 42 by an electrical interconnect 54.

Several materials could be utilized for piezoelectric elements. Piezoelectric elements could be Lead Zirconate Titanate, Zinc Oxide, Barium Titanate, Lead Titanate, Polyvinylindene Fluoride, Lithium Niobate, Lead Lanthanum Zirconate Titanate (PLZT).

The substrate could be a photosensitive glass. Ridges could be formed by selective etching of a substrate material. Ridges could be a separate material and bonded to a substrate. Suitable substrate materials could include photomachinable glasses. Photochemical machinable glasses are described in the article "Glasses and Glass-Ceramics for Application in Micromechanics" by D. Hulsenberg and R. Bruntsc, Journal of Non-Crystalline Solids 129(1991) 199–205. A suitable photomachinable glass could be Fotoceram. Fotoceram is a trade name of Corning, Inc., Corning, N.Y.

Fine spaces may be accurately fabricated in ceramic materials by the use of designed-space forming technology. Procedures and methods of forming embedded electrodes are described in the article "Application of Designed Space Forming Technology," Kazuaki Utsumi et al, Proceeding of the 6th Meeting on Ferroelectrics Materials and Their Application, Koto 1987, Japanese Journal of Applied Physics, Vol. 26 (1987) Supplement 26-2, pp. 53–56. This technique could be a suitable embedding means.

Additional techniques for creating cavities for embedded electrodes could include laser assisted chemical etching. Such techniques could include those described in the article "Excimer-Laser-Induced Etching of Ceramic PbTi $1-xZrxO3$" by M. Eyett and D. Bauerle, J. Appl. Physics, 62(4), Aug. 15, 1987. Individual shear mode elements could be etched from a piezoelectric material, and the processed piezoelectric material bonded to a glass substrate to form a composite shear mode array.

Techniques for poling piezoelectric materials are numerous and could include the use of auxiliary electrodes. Examples include "Continuous Poling of PZT Fibers and Ribbons and It's Application to New Devices," by T. J. Gururaja et al, Ferroelectrics, 1983, Vol. 47, pp. 193–200. Auxiliary electrodes could be deposited to assist in the poling. Such techniques are described in U.S. Pat. No. 3,487,339 to Hugo Schafft, Dec. 30, 1969. Techniques for influencing the crystallographic orientation of thin films exist and include U.S. Pat. No. 3,558,351 to Foster, Jan. 26, 1971. Additional techniques for deposition of thin films include "Metallo-Organic Decomposition (MOD) Processing of Ferroelectric and Electro-Optic Films: A Review" Robert W. Vest, Ferroelectrics, 1990, Vol. 102, pp. 53–68.

A suitable means for affixing the common electrode to the piezoelectric element could include the deposition of aluminum. Such techniques could be similar to that utilized to deposit electrodes to function as deflection plates in the miniature, directed electron beam source of U.S. Pat. No. 3,753,022 to Fraser, Aug. 1973.

Suitable means to connect the common electrode to the common buss could include conductive rubbers. Such materials are described in U.S. Pat. No. 2,998,546 to G. A. Kuntz et al, Aug. 29, 1961.

Interconnects between the drive electrode and the interface electrode could be made with laser-drilled vias. A suitable process is described in the article "Electrical Contacts to Implantable Integrated Sensors by CO2 Laser-Drilled Vias Through Glass", Micromachining and Micropackaging of Transducers, edited by C. D. Fung, et al.

The parallel shear mode element exhibits a very desirable behavior. The element maintains a parallelapipedal shape during deformation. No surface curvatures exist on the phase modulating surface as a function of surface deformation, as in other surface deformation type devices, such as cantilever beam devices. The surface profile associated with my invention, could enhance longevity of the phase modulating surface. This could be a significant advantage over prior art. In addition, the surface profile could enhance modulator efficiency. As described in the article "A Liquid-Crystal Phase Modulator for Large Screen Projection," by Michael Fritsch et al, IEEE Transactions on Electron Devices, Vol. 36, No. 9, Sept. 1989, phase modulation could have advantages over polarization modulation. Also the surface profile of my invention could diffract more energy into higher orders than the uniform phase modulation associated with a pixel element as described in the referenced article, thereby enhancing the modulator efficiency of my invention as compared to several alternatives. As described in the references provided herein, it is the slope of the wavefront modulations which are related to image contrast when considering small phase modulations. The surface deformation's characteristic of my inventions directly controls the wavefront slope modulations. Current practices in the state of the art do not take advantage of the phase variation across a pixel. As described in the article "Two-dimensional Silicon/Plzt Spatial Light Modulator: Design Considerations and Technology" by Sing H. Lee, et al. Optical Engineering/Feb. 1986, Vol. 25, No. 2, present art teaches uniformity in a pixel modulation characteristic. This could be desirable for polarization modulation schemes, but given the advantages of phase modulation as described in the references cited herein, it is evident that an improved diffraction efficiency associated with my invention represents a significant advance in the state of the art.

Figure 3:
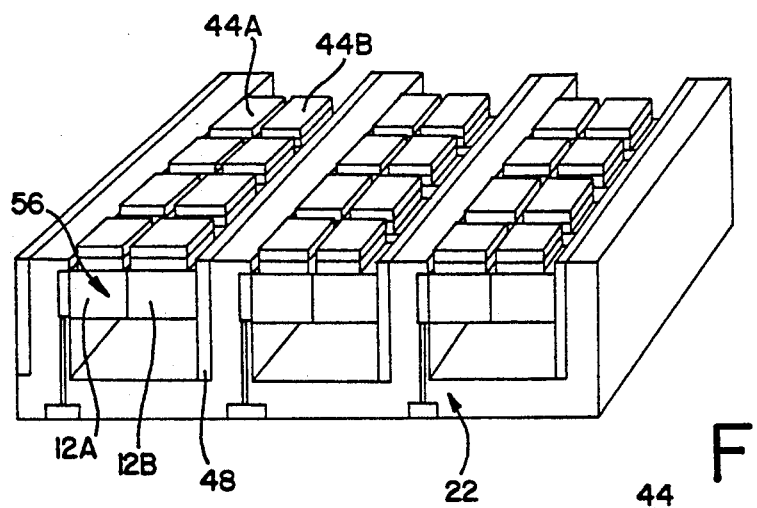
FIG. 3 shows a two spatial degree of freedom wavefront modulator containing bi-cell shear mode elements.

FIG. 3 shows a bi-cell shear mode element which could be a suitable means for affixing the common buss to each respective first face of a first piezoelectric element. Array 22 contains a plurality of bi-cell shear mode elements 56. Each element 56 contains a first piezoelectric shear mode element 12A and a second element 12B. The first face of element 12A is affixed by a suitable means to the second face of element 12B. (The first face and second face of each element 12 are not visible in this figure.) The first face of element 12B is affixed to common buss 48 by a suitable means. Motion characteristics of bi-cell 56 are well understood by those knowledgeable in the state of the art. Due to the motion characteristics of bi-cell 54, the first face of element 12B could be held rigid or a flexible interconnect could be utilized to establish electrical connection to buss 48. Considerations for deciding on rigid or flexible interconnects to the common buss could include how the constraint effects hysteresis. The piezoelectric polarization direction of element 12 could be parallel or anti-parallel to 12B depending upon whether different materials are utilized for the two elements. Such considerations could be utilized to enhance the stiffness of the bi-cell. Each element 12 of bi-cell 56 contains a respective reflective suitable means 44. If desired, a single reflective means could be utilized with each bi-cell element.

Bi-cell configurations could be constructed by bonding respective piezoelectric elements which are affixed to adjacent ridges. The array could then be assembled as a series of ridge laminations which have been bonded together. Other techniques for fabricating bi-cells could involve materials which exhibit a ferroelectric inversion layer. Procedures for creating an inversion layer could include those described in the article "Hysteresis-Free Piezoelectric Actuators Using LiNbO3 Plates with a Ferroelectric Inversion Layer" by K. Nakamura and H. Shimizu, Ferroelectrics, 1989, Vol. 93, pp. 211–216. Furthermore, the piezoelectric shear mode coefficient of each element in the bi-cell could be different to introduce a dynamic load stress. Such a consideration could influence the hysteresis characteristics and is included as an option to be employed in my invention. In addition, bi-cells constructed by bonding shear mode elements could have the shear mode elements electrically activated prior to assembly so a stress state could exist in the no modulation signal state. Elements to be electrically activated and bonded could be shaped to provide a desired symmetry concerning respective surfaces 42 of each element in the bi-cell.

Figure 4:
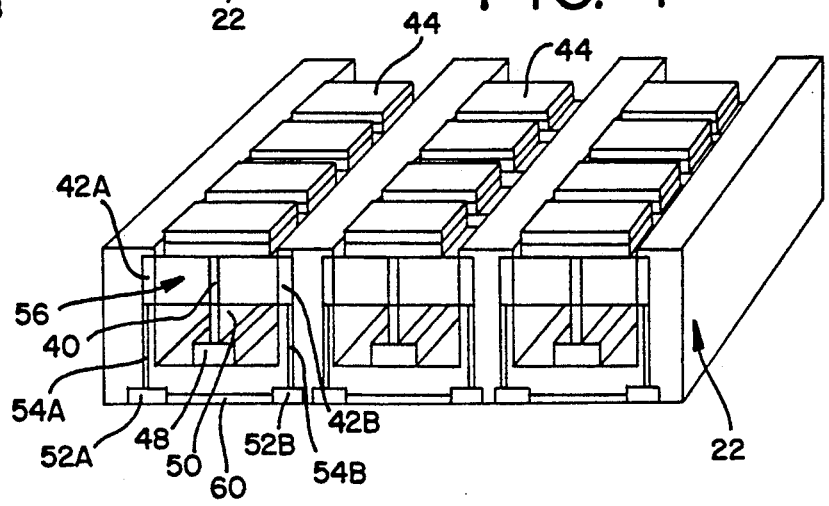
FIG. 4 shows a second bi-cell modulator configuration.

FIG. 4 shows an alternative configuration for modulator array containing a plurality of bi-cell shear elements 56. Common electrode 40 is affixed to the first face of element 12A by a suitable means. The second face of element 12B is affixed to common electrode 40 by a suitable means. (The first face and second face of every element are not visible in this figure.) An interface electrode 42A is affixed by a suitable means to the second face of element 12A. An interface electrode 42B is affixed by a suitable means to first face of element 12B. Each common electrode 40 in array 22 is affixed by a suitable means 50 to common buss 48. Drive electrode 52A is connected to electrode 42A by interconnect 54A. Drive electrode 52B is connected to electrode 42B by interconnect 54B. Drive electrode 52A and drive electrode 52B are electrically connected by a drive interconnect 60. Each bi-cell element 56 contains a suitable reflection means 44. A single means 44 is shown common to both elements 12 of each bi-cell 56. As previously described, each element of a bi-cell could have a respective reflective means.

Constructing arrays with bi-cells could allow prestressing of shear mode elements. As described in the references provided herein, the response of a piezoelectric device could depend on the operating point associated with its hysteresis curve. Accordingly, provisions could be provided in my invention to utilize this factor to enhance the shear mode modulator array performance characteristics.

Figure 5:
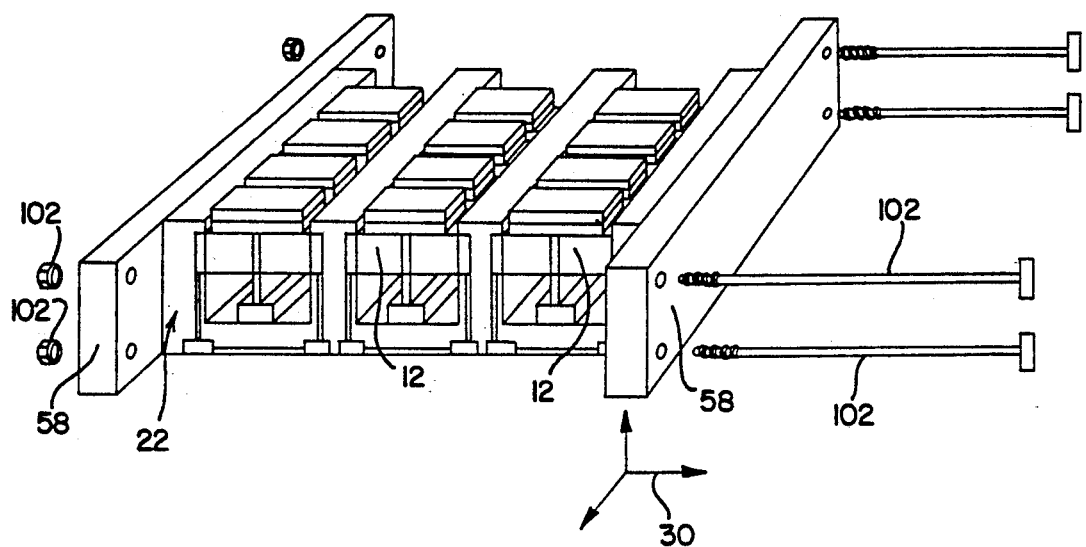
FIG. 5 shows a second configuration for the common buss.

FIG. 5 shows an array 22 which contains suitable stressing element 58. Element 58 could be a clamp mechanism which could be adjusted to provide a suitable stress level. A compression element 102 is utilized to create a compression force parallel to axis 30 to provide a strain bias to every element 12 in array 22. Prestressing along other axes could enhance the device performance and will be described herein.

Figure 6:
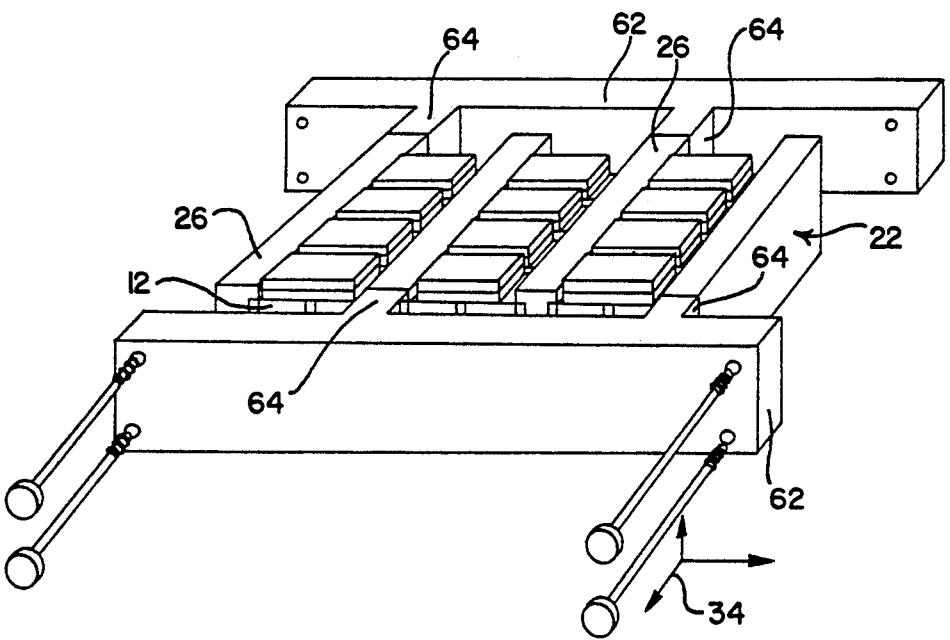
FIG. 6 shows a first prestressing option.

FIG. 6 shows a suitable prestressing means. Such a suitable means could include sawtooth clamp pair 62. Clamp 62 contains a plurality of teeth 64. Teeth 64 are utilized to apply shearing stresses to ridges 26. Such a clamp utilizes alternating signs on compression force components parallel to axis 34, thereby creating strain biases in every element 12 in array 22. Ridges could be prestressed after bonding bi-cell elements and then the ridges bonded in the stressed state to a suitable substrate. The above prestressing techniques could be utilized in combination and with different piezoelectric materials to achieve suitable operating points for the shear mode elements.

FIG. 7 shows an alternative configuration which could be utilized to affix piezoelectric elements to the common buss. An alternative configuration for routing the common buss could be utilized. FIG. 7 shows a common buss 48 located on a crown surface of each ridge 26. (Crown surface is not visible in this figure.) A suitable means to interconnect common electrode 40 to buss 48 could utilize phase modulating surface 44. Surface 44 could be electrically conductive. Having surface 44 function as an electrical interconnect increases the functionality of array components. A thermal insulator 66 is utilized between substrate 24 and each ridge 26. Insulator 66 could reduce the heat transfer to elements 12. Insulator 66 could be connected to a suitable heat exchanger to stabilize the temperature of elements 12. Insulator 66 could be a thin film of diamond. Such an insulator could be formed by the "Diond" process. Diond is a registered trademark of the Beam Alloy Corporation, Dublin, Ohio. The common buss 48 could be a suitable means for conductive heat transfer, further enhancing the functionality of the array components. The increased functionality yields a device configuration which is amendable to performance enhancements necessary for a new use application of parallel shear mode elements in display applications.

As previously identified, charge drive configurations could enhance the performance of piezoelectric actuactors. Charge drive configurations could include voltage controlled current sources. A voltage controlled current source array, which could be interfaced to my invention, includes the VCCS array described in the patent application submitted by Craig D. Engle titled "Ordered, Three Dimensional Circuits" and is hereby incorporated as a reference in this patent application. Accordingly, each output interface of the three dimensional current source array could be electrically connected by a suitable means to a respective drive electrode of the two dimensional parallel shear mode modulator array. Topology considerations to enhance spatial resolution, as well as heat transfer considerations, are fully described in the referenced patent application. Of noteworthy concern is the ability of this configuration to be framed sequenced, resulting in a high luminous efficiency, and a high frame rate capability, offering desirable performance characteristics for display applications, including display applications in the infrared portion of the electromagnetic spectrum.

Charge drive configurations could include electron beam addressing of the drive electrodes. Due to the established nature of electron beam technologies, a diversity of techniques are available. A few approaches will be described to illustrate the principles involved and to illustrate the flexibility of the common buss structure of my invention. It is the flexibility of the common buss structure which allows my invention to be amendable with a variety of electron beam addressing options. This could be instrumental in the reduction of hysteresis and creep phenomena which have plagued previous piezoelectric modulators.

Suitable electron beam addressing techniques which could be utilized to electron beam address the shear mode array of my invention are described in the articles, "E-Beam DKDP Light Values" by David Casasent, Optical Engineering/Vol. 17, No. 4/July-August 1978, "Pockels-Effect Imaging Devices and Their Applications" by G. Marie et al, Advances in Image Pick-Up and Display Devices, pp. 225-302, "Light Values Using DKDP Operated Near It's Curie Point: Titus and Phototitus" by G. Marie, Ferroelectrics, 1976, Vol. 10, pp. 9-14, and "Liquid Crystal Media for Electron Beam Recording" by J. R. Hansen, and R. J. Schneeberger, IEEE Transactions on Electron Devices, Vol. ED-15, No. 11, November 1968.

FIG. 8 shows a suitable electron beam addressing configuration which could be utilized in my invention. Due to the latitude of the common buss implementation of my invention, different electron beam addressing techniques could be implemented as changes in the operating characteristics of the basic components of the suitable electron beam addressing configuration. FIG. 8 shows an evacuated envelope 68, which could be of any suitable material such as glass or metal, and any suitable shape such as that of a conventional CRT having an electron gun 70 at one end and a target 72 at the other. Electron gun 70 is a suitable means to transform a modulation control signal to an electron beam current. (Source of modulation signal and electron beam not shown for convenience.) Electron gun 70 includes a grid 74 to vary the electron beam current. Grid 74 is a suitable means to vary the electron beam current in response to a modulation control signal. Techniques for applying a control signal to the grid and grid construction for beam current control are well understood by those knowledgeable in the state of the art and are not shown in detail. Substrate 24 functions as a faceplate 76 for envelope 68. Substrate 24 includes an addressing face (addressing face is not visible in this figure). Target 72 is affixed by a suitable means to the addressing face. Envelope 68 further includes an anode 76. Envelope 68 further includes a suitable beam positioning means 78 to position the electron beam in accordance with a desired drive electrode positioning sequence. The positioning means 78 could be electromagnetic deflection. Such positioning means, and the signal synchronization required with the modulation control signal, are well understood by those knowledgeable in the state of the art and are not shown in detail. Envelope 68 further contains an electron collector 80. Construction of the collector could vary depending upon the particular implementation. Several different collector configurations are described in the references. Envelope 68 further contains a suitable acceleration potential means (acceleration potential means not shown). Such a potential means could be the voltage differential applied to a cathode 82 of gun 70 and collector 80. Anode 76 could be held at a common potential with collector 80. Target 72 could be a suitable secondary emissions means. Secondary emissions means could be a dielectric. Suitable dielectrics are identified in the references. As well understood by those knowledgeable in the state of the art, secondary emissions curves desirable for use in electron beam addressed display devices could exhibit a first crossover point and a second crossover point. As identified in the book "Electronic Image Storage" by B. Kazan and M. Knoll, p. 16, Section 2, the surface of the target may be an insulator, a semiconductor, or a metal. However, if the surface is conductive, it is assumed to consist of individual small elements insulated from each other as well as from the backplate." The addressing face of substrate 24 could be the target. Drive electrodes would function as the above mentioned metal interfaces. Drive electrodes 52 embedded in substrate 24 are recessed by a recess distance 84 recessed from the addressing face. As well understood by those knowledgeable in the state of the art, this could be a suitable heat transfer means. Capacitive coupling of a modulation signal to a respective modulator element are well understood by those knowledgeable in the state of the art. Conductive heat transfer member 96 is in thermal contact with target 72. Member 96 is feedthrough a vacuum feedthrough 98 in envelope 68. Member 96 is utilized with a suitable heat exchanger to provide a suitable heat transfer means. Suitable heat exchangers are well understood by those knowledgeable in the state of the art, and is not shown in the figure.

As described in Electronic Image storage, a variety of operational modes are possible. Particular configurations are identified by the operating characteristics associated with various components of the envelope.

A suitable electron beam configuration which could be utilized by my invention is similar to that described in U.S. Pat. No. 3,637,931 to Donjon et al, Jan. 25, 1972. The collector described in the above mentioned patent is a grid. As cited in the references herein, a suitable collector for this configuration could involve a second grid.

In FIG. 8 an acceleration potential means is chosen so secondary electron emissions yield of target 72 is greater than one. A suitable video modulation means applies the modulating control signal between collector and common buss 48. Suitable video modulation means are well understood by those knowledgeable in the state of the art, and are not shown in the figure. The electron beam current is maintained constant at a suitable level. Furthermore, to avoid defocusing of the electron beam during modulation, the potential of the collector could be fixed and the modulation control signal applied to the common buss. This configuration has a desirable feature of providing a flickerless display capability when utilizing appropriate optical projection systems. Appropriate optical systems are well understood by those knowledgeable in the state of the art.

The electron beam addressing configuration of FIG. 8 could be configured to be utilized in a "Sticking Potential" mode. Sticking potential configurations are described in the reference provided herein. Additional information is available in U.S. Pat. No. 3,626,084 to Whol, Dec. 7, 1971. Acceleration potential means is configured to establish a potential significantly above the second crossover point of the characteristic secondary electron emissions curve associated with target 72.

Such a means could be a negative voltage applied to cathode 82 with collector 80 and common buss 48 maintained held at ground potential. Collector 80 could be any suitable geometry. Suitable geometries are understood by those knowledgeable in the state of the art. The modulation control signal is applied to grid 74 by a suitable means. As well understood by those knowledgeable in the state of the art, a suitable means must be provided to remove electrons from the target. Suitable means could include varying the acceleration potential means to create a secondary emissions yield greater than 1 of target 72. Suitable erase means could include a "flood type" electron gun operated at a suitable beam current and acceleration potential. Considerations involved in the selection of the operating characteristics of a flood gun to achieve a desired persistence are well understood by those knowledgeable in the state of the art, and are not presented herein.

Heat transfer could be introduced with electron beam addressed modulators utilizing the concept of an enhanced wire mosaic. Such a device could be similar to that identified in FIG. 9. A wire mosaic 86 has a plurality of feedthroughs 88. Each feedthrough 88 is electrically connected to a respective drive electrode 52 by a bump interconnect 90. Due to the presence of interconnect 90, a separation gap 92 is established between a mating face of mosaic 86 and an address face 94 of substrate 24. (Mating face of mosaic is not visible in the figure.) Substrate 24 contains ridge 26, ridges 26 further contain elements 12. Elements 12 contain a fourth face 100. A suitable heat transfer agent could be introduced into the separation gap for heat transfer purposes. Such a heat transfer agent could be an inert fluid. Such an inert fluid could be silicone oil or a fluroinert chemical liquid. A suitable fluroinert chemical liquid could be similar to the liquid described in the article "Heat Transfer Characteristics of Fluorochemical Inert Liquid FC-75" by M. C. Maracellus et al, Journal of Chemical and Engineering Data, Vol. 6, No. 3, July 1961. Additional heat transfer agents could include fluroinert liquid. Fluroinert is a trade name of the 3M Company, St. Paul, Minn. The heat transfer agent also functions as an electrical insulator between adjacent interconnects 90, increasing it's functionality.

An alternative method on interconnecting a feedthrough to a respective drive electrode could include capacitive coupling. Such a configuration could be constructed by eliminating the bump interconnect and maintaining an appropriate separation gap. Such a configuration could influence the thermal resistance to the modulator elements and enhance heat transfer to the shear mode elements.

The wire mosaic could form the vacuum seal in electron beam addressed devices as described in the references cited herein. Alternatively, the substrate could form the vacuum seal. Techniques for circulating a heat transfer agent through a vacuum seal could be similar to those described in U.S. Pat. No. 4,775,817 to Dawaer et al, Oct. 4, 1988. The heat transfer agent would be utilized in an enhance wire mosaic separation gap in accordance with the practice of my invention. Having the substrate seal the vacuum could reduce dimensions associated with the mosaic, which could reduce capacitive coupling between adjacent feedthroughs. Selection of substrate materials could influence heat transfer to ridges and to piezoelectric elements. As such, material selection for a substrate could be a suitable means for heat transfer.

Conclusions, Ramifications, and Scope of Invention

While my above description contains many specificities, these should not be construed as limitations on the scope of the invention, but rather as an exemplification of one preferred embodiment thereof. Many other variations are possible.

Several concepts have been introduced to create a two independent spatial variable degree of freedom piezoelectric parallel shear wavefront modulator. These enhancements make feasible a new use patent; a reflective parallel shear mode surface deformation type device for use in wavefront modulator applications, including display applications. Several advantages exist due to my invention. Polarization requirements have been eliminated resulting in increased luminous efficiency for use in wavefront modulators. A surface deformation profile has been identified which could enhance longevity of surface deformation type wavefront modulators, and using my invention yields a display device capable of extended spectral capability and enhanced speed of response, in addition to improved diffraction efficiency.

Several additional charge drive configurations could be utilized with my invention. As identified in the references cited herein, a large potential difference could be established between the common buss and the collector of an electron beam addressed configuration, thereby generating a strain bias. Such a bias could enhance linearity. In addition, cathode stabilized modes of operation could be utilized in electron beam addressed configurations. A modulation signal could then operate the shear mode element about this strain bias operating point.

Conventional target heat transfer means could be utilized. These include peltier coolers.

Further electron beam addressed configurations could include microchannel plates. Having a common electrode to all elements in a modulator array is conducive to parallel frame erase and frame load operations. The microchannel plate is a high voltage device, compatible with the operating voltages required by some piezoelectric implementations of my invention. Methods of interfacing a microchannel plate to my invention are well understood by those knowledgeable in the state of the art.

The preferred configuration of my invention is the single shear mode element electron beam addressed in a collector stabilized configuration. Accordingly, the scope of the invention should be determined not by the embodiments illustrated, but by the appended claims and their legal equivalents.

I claim:

1. A two independent spatial variable degree of freedom piezoelectric parallel shear mode wavefront phase modulator array compromising:
   a substrate,
   a plurality of ridges affixed to said substrate by a suitable means,
   adjacent said ridges are displaced by a first period,
   affixed to each said ridge by a suitable embedding means is a plurality of essentially similar piezoelectric elements,
   every said element affixed to each said ridge is piezoelectrically polarized along a first axis,
   adjacent said elements affixed to each said ridge are displaced by a second period,
   said second period is perpendicular to said first period,
   said second period is perpendicular to said first axis of every said element affixed to each said ridge,
   every said element affixed to each said ridge further includes a first side face and a second side face, said first side face and said second side face of every said element affixed to each said ridge are opposing surfaces,
   affixed by a suitable means to said second face of every said element affixed to each said ridge is a respective interface electrode,
   said suitable embedding means further includes embedding said respective interface electrode affixed to said second face of every said element affixed to each said ridge in said ridge, thereby concealing and electrically isolating said respective interface electrodes affixed to adjacent said elements,
   said first face of every said element affixed to each said ridge is electrically connected to a respective common buss by a suitable common interconnect means thereby avoiding electrical interference between adjacent said elements affixed to each said ridge by enhancing the functionality of each said ridge and said common interconnect means,
   every said respective common buss is affixed by a suitable means to said substrate,
   affixed by a suitable optical affixing means to every said element affixed to each said ridge is a respective optically reflective surface,
   every said element affixed to each said ridge further includes a respective rotation axis,
   said respective rotation axis of every said element affixed to each said ridge is parallel to said second period,
   a suitable potential control means to apply between each said respective common buss and said respective interface electrode affixed to every said element electrically connected to said respective buss a respective potential difference,
   whereby varying each said respective potential difference rotates said respective optically reflective surface affixed to said element about said respective rotation axis of said element by a suitable piezoelectric parallel shear mode means,
   thereby phase modulating an electromagnetic and/or an acoustic wavefront incident thereon while providing enhanced diffraction efficiency and reliability.

2. The device of claim 1 further including a plurality of drive electrodes, each said drive electrode is affixed by a suitable means to said substrate,
   said respective interface electrode affixed to every said element affixed to each said ridge is electrically connected by a suitable means to a respective drive electrode,
   said suitable potential control means further includes applying each said respective potential difference to said respective drive electrode,
   said suitable piezoelectric parallel shear mode means further includes said first axis of every said element affixed to each said ridge is parallel to said second face of said element,
   said respective rotation axis of every said element affixed to each said ridge is contained in said second face of said element.

3. The device of claim 2 wherein said first axis of every said element affixed to each said ridge is perpendicular to said first period, said suitable optical affixing means further includes
said first axis of every said element affixed to each
said ridge is perpendicular to said respective optically reflective surface affixed to said element
when every said element affixed to each said ridge
is unenergized, said suitable common interconnect means further
electrically connecting by a suitable mean a suitable conductor between said first face of every said
element affixed to each said ridge and said respective common buss.

4. The device of claim 3 wherein every said respective common buss is electrically connected to a common potential source by a suitable means.

5. The device of claim 1 wherein said suitable common interconnect means further includes electrically
connecting said first face of every said element affixed
to each said ridge to a respective second piezoelectric
element by a suitable element interconnect means, each said respective second piezoelectric element is
piezoelectrically polarized along a first axis, each said respective second piezoelectric element
further includes a first side face and a second side
face, said first side face and said second side face of each
said respective second element are opposing surfaces, said suitable element interconnect means further includes affixing by a suitable means said first face of
every said element affixed to each said ridge to said
second face of said respective second element, said
first face of said respective second element affixed
to every said element affixed to each said ridge is
electrically connected by a suitable means to said
respective common buss, affixed to each said respective second element by a
suitable optical affixing means is a respective optical reflective surface, each said respective second element further includes
a respective rotation axis, said respective rotation
axis of every said respective second element is
parallel to said second period, said suitable element interconnect means further includes said first axis of every said element affixed to
each said ridge is parallel to said first axis of said
respective second element, whereby varying each said respective potential difference rotates said respective optically reflective
surface affixed to said respective second element
affixed to said element about said respective rotation axis of said respective second element affixed
to said element thereby phase modulating said
wavefront incident thereon.

6. The device of claim 5 further including a plurality
of drive electrodes affixed to said substrate by a suitable
means, each said respective interface electrode is electrically
connected to a respective drive electrode by a
suitable means, said suitable potential control means further includes
applying each said respective potential difference
to said respective drive electrode, said suitable piezoelectric parallel shear mode means
further includes said first axis of every said element
affixed to each said ridge being parallel to said
second surface of said element, said respective rotation axis of every said element
affixed to each said ridge is contained in said second face of said element, said first axis of every said respective second element
is parallel to said second surface of said respective
second element, said suitable optical affixing means further includes
said first axis of every said element affixed to each
said ridge is perpendicular to said respective optically reflective surface affixed to said element
when every said element is unenergized, said suitable optical affixing means further includes
said first axis of every said respective second element being perpendicular to said respective optically reflective surface affixed to said respective
second element when every said element is unenergized, said first axis of every said element affixed to each
said ridge is perpendicular to said first period.

7. The device of claim 6 wherein every said respective common buss is electrically connected to a common potential source by a suitable means.

8. The device of claim 1 wherein said suitable common interconnect means further includes electrically
connecting by a suitable means a suitable conductor
between said first face of every said element affixed to
each said ridge and said respective common buss, connected by a suitable element interconnect means
to said first face of every said element affix to each
said ridge is a respective second piezoelectric element, each said respective second element is piezoelectrically polarized along a first axis, each said respective second element further includes
a first side face and a second side face, said first side
face and said second side face of each said respective second element are opposing surfaces, said suitable element interconnect means further includes electrically connecting by a suitable means a
suitable conductor between said second face of said
respective second element connected to said first
face of every said element affixed to each said ridge
and said respective common buss electrically connected to said first face of every said element affixed to each said ridge, affixed by a suitable means to said first face of each
said respective second element is a respective interface electrode, said interface electrode affixed to said respective
second element affixed to every said element affixed to each said ridge is embedded by a suitable
embedding means in an adjacent ridge, said suitable embedding means further includes embedding each said respective interface electrode
affixed to said respective second element in said
adjacent ridge so as to conceal and electrically
isolate said respective interface electrodes affixed
to adjacent said respective second elements, affixed to each said respective second element by a
suitable optical affixing means is a respective optically reflective surface, each said respective second element further includes
a respective rotation axis, said respective rotation axis of every said respective
second element is parallel to said second period, said suitable element interconnect means further includes said first axis of every said element affixed to each said ridge is parallel to said first axis of said respective second element, said suitable potential control means further includes applying between each said respective common buss and said respective interface electrode affixed to every said respective second element electrically connected to said respective buss a respective second potential difference, whereby varying each said respective second potential difference rotates said respective optically reflective surface affixed to said respective second element about said respective rotation axis of said respective second element thereby phase modulating an electromagnetic and/or acoustic wavefront incident thereon.

9. The device of claim 8 further including a plurality of drive electrodes affixed to said substrate by a suitable means, each said respective interface electrode affixed to every said element affixed to each said ridge and each said respective interface electrode affixed to every said respective second element are electrically connected by a suitable means to a respective drive electrode, each said respective potential difference is applied to said respective drive electrode, each said respective second potential difference is applied to said respective drive electrode, said suitable piezoelectric shear mode means further includes said first axis of every said element affixed to each said ridge is parallel to said second face of said element, said respective rotation axis of every said element affixed to each said ridge is contained in said second face, said first axis of every said element affixed to each said ridge is perpendicular to said first period.

10. A two independent spatial variable degree of freedom piezoelectric parallel shear mode wavefront phase modulator array comprising:

a substrate, a plurality of ridges affixed to said substrate by a suitable means, adjacent said ridges are displaced by a first period, affixed to each said ridge by a suitable embedding means is a plurality of essentially similar piezoelectric parallel shear mode elements, every said element affixed to each said ridge is piezoelectrically polarized along a first axis, adjacent said elements affixed to each said ridge are displaced by a second period, said second period is perpendicular to said first period, said first axis of every said element affixed to each said ridge is perpendicular to said second period, every said element affixed to each said ridge further includes a first side face and a second side face, said first face and said second face of every said element affixed to each said ridge are opposing surfaces, affixed to said second face of every said element affixed to each said ridge is a respective interface electrode, said suitable embedding means further includes embedding said respective interface electrode affixed to said second face of every said element affixed to each said ridge in said ridge, thereby concealing and providing a electrical isolation to said respective interface electrodes affixed to adjacent said elements, said first face of every said element affixed to each said ridge is electrically connected to a common potential source by a suitable common interconnect means thereby avoiding electrical interference between adjacent said elements affixed to each said ridge by enhancing the functionality of each said ridge and said common interconnect means, affixed by a suitable optical affixing means to every said element affixed to each said ridge is a respective optically reflective surface, every said element affixed to each said ridge further includes a respective rotation axis, said respective rotation axis of every said element affixed to each said ridge is parallel to said second period, a suitable potential control means to apply between said common potential source and said respective interface electrode affixed to said second face of every said element affixed to each said ridge a respective potential difference, whereby varying each said respective potential difference rotates said respective optically reflective surface affixed to said element about said respective rotation axis of said element by a suitable piezoelectric parallel shear mode means thereby phase modulating an electromagnetic and/or acoustic wavefront incident thereon while providing enhanced diffraction efficiency and reliability.

11. The device of claim 10 further including a plurality of drive electrodes, each said drive electrode is affixed to said substrate by a suitable means, each said respective interface electrode affixed to every said element affixed to each said ridge is electrically connected by a suitable means to a respective drive electrode, said suitable potential control means further includes applying each said respective potential difference to said respective drive electrode, said suitable piezoelectric parallel shear mode means further includes said first axis of every said element affixed to each said ridge is parallel to said second face of said element, said respective rotation axis of every said element affixed to each said ridge is contained in said second face of said element.

12. The device of claim 11 wherein said first axis of every said element affixed to each said ridge is perpendicular to said first period, said suitable optical affixing means further includes said first axis of every said element affixed to each said ridge is perpendicular to said optically reflective surface affixed to said element when every said element affixed to each said ridge is unenergized, said suitable common interconnect means further includes electrically connecting by a suitable means a suitable conductor between said first face of every said element affixed to each said ridge and said common potential source.

13. The device of claim 10 wherein said suitable common interconnect means further includes electrically connecting said first face of every said element affixed to each said ridge to a respective second piezoelectric element by a suitable element interconnect means, each said respective second element is piezoelectrically polarized along a first axis, each said respective second element further includes a first side face and a second side face, said first side face and said second side face of each said respective second element are opposing surfaces, said suitable element interconnect means further includes affixing said first face of every said element affixed to each said ridge to said second face of said respective second element, said first face of every said respective second element is electrically connected to said common potential source by a suitable first face means, affixed to each said respective second element by a suitable optical affixing means is a respective optically reflective surface, each said respective second element further includes a respective rotation axis, said respective rotation axis of every said respective second element is parallel to said second period, said suitable element interconnect means further includes said first axis of every said element affixed to each said ridge is parallel to said first axis of said respective second element, whereby varying each said respective potential difference rotates said respective optically reflective surface affixed to said respective second element affixed to said element about said respective rotation axis of said respective second element affixed to said element thereby phase modulating said wavefront incident thereon.

14. The device of claim 13 further including a plurality of drive electrodes, each said drive electrode is affixed to said substrate by a suitable means, each said respective interface electrode affixed to every said element affixed to each said ridge is electrically connected by a suitable means to a respective drive electrode, said suitable potential control means further includes applying each said respective potential difference to said respective drive electrode, said suitable piezoelectric parallel shear mode means further includes said first axis of every said element affixed to each said ridge is parallel to said second face of said element, said respective rotation axis of every said element affixed to each said ridge is contained in said second face of said element.

15. The device of claim 14 wherein said first axis of every said element affixed to each said ridge is perpendicular to said first period, said suitable optical affixing means further includes said first axis of every said element affixed to each said ridge is perpendicular to said optically reflective surface affixed to said element when every said element affixed to each said ridge is unenergized, said suitable first face means further includes electrically connecting by a suitable means a suitable conductor between said first face of every said respective second element and said common potential source.

16. The device of claim 10 wherein said suitable common interconnect means further includes electrically connecting by a suitable means a suitable conductor between said first face of every said element affixed to each said ridge and said common potential source, connected by a suitable element interconnect means to said first face of every said element affixed to each said ridge is a respective second piezoelectric element, each said respective second element is piezoelectrically polarized along a first axis, each aid respective second element further includes a first side face and a second side face, said first side face and said second side face of each said respective second element are opposing surfaces, said suitable element interconnect means further includes electrically connecting by a suitable means a suitable conductor between said second face of every said respective second element and said common potential source, said suitable element interconnect means further includes said first axis of every said element affixed to each said ridge is parallel to said first axis of said respective second element, affixed to said first face of each said respective second element is a respective interface electrode, said respective interface electrode affixed to said respective second element affixed to every said element affixed to each said ridge is embedded by a suitable embedding means in an adjacent ridge thereby concealing and providing electrical isolation to said respective interface electrodes affixed to adjacent said respective second elements, affixed to each said respective second element by a suitable optical affixing means is a respective optically reflective surface, each said respective second element further includes a respective rotation axis, said respective rotation axis of every said respective second element is parallel to said second period, said suitable potential control means further includes applying between said common potential source and said respective interface electrode affixed to each said respective second element a respective second potential difference, whereby varying each said respective second potential difference rotates said respective optically reflective surface affixed to said respective second element about said respective rotation axis of said respective second element thereby phase modulating an electromagnetic and/or acoustic wavefront incident thereon.

17. The device of claim 16 further including a plurality of drive electrodes, each said drive electrode is embedded in said substrate by a suitable means, said respective interface electrode affixed to every said element affixed to each said ridge and said respective interface electrode affixed to every said respective second element are electrically connected by a suitable means to a respective drive electrode, said suitable potential control means further includes applying each said respective potential difference to said respective drive electrode, said suitable potential control means further includes applying each said respective second potential difference to said respective drive electrode;

said suitable piezoelectric parallel shear mode means further includes said first axis of every said element affixed to said ridge is parallel to said second surface of said element, said respective rotation axis of every said element affixed to each said ridge is contained in said second face of said element, said first axis of every said element affixed to each said ridge is perpendicular to said first period, said suitable optically affixing means further includes said first axis of every said element affixed to each said ridge is perpendicular to said respective optically reflective surface affixed to said element when every said element affixed to each said ridge is unenergized.

18. The device of claim 10 wherein said suitable potential control means further includes a suitable electron beam addressing means, said electron beam addressing means further includes a means for generating an electron beam, a suitable scanning means for scanning a scanning face of said substrate, an anode for collecting secondary electrons released from said substrate.

19. An enhanced piezoelectric parallel shear mode wavefront phase modulator array comprising:

a suitable support, affixed to said support by a suitable embedding means is a plurality of piezoelectric parallel shear mode elements, each of said piezoelectric elements is piezoelectrically polarized along a first axis, adjacent said elements affixed to said support are displaced by an element period, each said element further includes a first side face and a second side face, said first side face and said second side face of each said element are opposing surfaces, affixed to said second side face of each said element is a respective interface electrode, said suitable embedding means further includes embedding said respective interface electrode affixed to every said element in said support to conceal and electrically isolate said respective interface electrodes affixed to adjacent said elements, said first face of every said element is electrically connected to a common buss by a suitable common interconnect means thereby avoiding electrical interference between adjacent said elements affixed to said support by enhancing the functionality of said support and said common buss, said common buss is affixed to said support by a suitable means, affixed to each said element by a suitable optical affixing means is a respective optical reflective surface, said suitable optical affixing means further includes said first axis of every said element intersecting said optically reflective surface affixed to said element, each said element further includes a respective rotation axis, said respective rotation axis of every said element is parallel to said element period, a suitable potential control means to apply between said common buss and said respective interface electrode affixed to every said element a respective potential difference, whereby varying each said respective potential difference rotates said respective optically reflective surface affixed to said element about said respective rotation axis of said element by a suitable piezoelectric parallel shear mode means, thereby phase modulating an electromagnetic and/or acoustic wavefront incident thereon while enhancing diffraction efficiency and reliability.

20. The device of claim 19 further including a plurality of supports, each said support is affixed to a substrate by a suitable means, adjacent said supports affixed to said substrate are displaced by a first period, said first period is perpendicular to said element period, said first period is perpendicular to said first axis of every said element affixed to each said support.

* * * * *